(12) United States Patent
Chang (10) Patent No.: US 11,247,596 B1
(45) Date of Patent: Feb. 15, 2022

(54) SYSTEM AND APPARATUS FOR GENERATING VIBRATION OF SEAT OF VEHICLE IN SYNC WITH MUSIC

(71) Applicants: HYUNDAI MOTOR COMPANY, Seoul (KR); KIA MOTORS CORPORATION, Seoul (KR)

(72) Inventor: Kyoung Jin Chang, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/154,618

(22) Filed: Jan. 21, 2021

(30) Foreign Application Priority Data

Sep. 10, 2020 (KR) .................. 10-2020-0116138

(51) Int. Cl.
| | | |
|---|---|---|
| *A61H 1/00* | (2006.01) | |
| *B60N 2/02* | (2006.01) | |
| *A47C 27/08* | (2006.01) | |
| *B60N 2/90* | (2018.01) | |
| *B60N 2/06* | (2006.01) | |
| *B60N 2/16* | (2006.01) | |

(52) U.S. Cl.
CPC ........... *B60N 2/976* (2018.02); *B60N 2/0232* (2013.01); *B60N 2/06* (2013.01); *B60N 2/1635* (2013.01)

(58) Field of Classification Search
CPC ........ A61H 23/0236; A61H 2201/0149; A61H 2201/5048; A47C 7/727; A47C 1/0242; B60N 2/0232; B60N 2/976
See application file for complete search history.

(56) References Cited

U.S. PATENT DOCUMENTS

| | | | | |
|---|---|---|---|---|
| 5,368,359 A | * | 11/1994 | Eakin ................. | A61H 23/0236 297/184.14 |
| 6,027,463 A | * | 2/2000 | Moriyasu ........... | A61H 23/0236 601/46 |
| 7,794,014 B2 | * | 9/2010 | Beall ........................ | A47C 7/72 297/217.4 |
| 8,042,868 B2 | * | 10/2011 | Sakai ................... | B60N 2/0244 297/217.3 |

(Continued)

FOREIGN PATENT DOCUMENTS

| | | |
|---|---|---|
| JP | 10-066346 A | 3/1998 |
| JP | 2002-0041094 A | 2/2002 |

(Continued)

*Primary Examiner* — Shin H Kim
(74) *Attorney, Agent, or Firm* — Morgan, Lewis & Bockius LLP (57) ABSTRACT

A system for generating a vibration of a seat of a vehicle in sync with music outputted from an audio device using an electric motor included in the seat to adjust the seat in forward and backward directions and upward and downward directions includes: an electric-motor multiple-control circuit configured to receive a signal of a seat position adjustment switch and a signal of an audio switch, generate a driving current required to vibrate the seat, and output the driving current to an electric motor. The electric motor receives a signal from the electric-motor multiple-control circuit and generates a motor torque while being driven, and the generated motor torque is transferred to the seat to generate a target vibration in the seat.

12 Claims, 7 Drawing Sheets

(56) References Cited

U.S. PATENT DOCUMENTS

| | | | | |
|---|---|---|---|---|
| 8,668,045 | B2* | 3/2014 | Cohen | H04R 5/04 |
| | | | | 181/150 |
| 10,038,952 | B2* | 7/2018 | Labrosse | A61M 21/02 |
| 10,827,829 | B1* | 11/2020 | Labrosse | A47B 9/20 |
| 2007/0025575 | A1* | 2/2007 | Oser | H04R 9/066 |
| | | | | 381/333 |
| 2007/0257530 | A1* | 11/2007 | Florez | A47C 7/38 |
| | | | | 297/217.4 |
| 2008/0054561 | A1* | 3/2008 | Canterbury | G07F 17/3202 |
| | | | | 273/148 B |
| 2010/0066137 | A1* | 3/2010 | Sakai | B60N 2/0228 |
| | | | | 297/217.3 |
| 2010/0320819 | A1* | 12/2010 | Cohen | A61H 23/0236 |
| | | | | 297/217.4 |
| 2015/0008710 | A1* | 1/2015 | Young | B60N 2/976 |
| | | | | 297/217.3 |

FOREIGN PATENT DOCUMENTS

| | | |
|---|---|---|
| JP | 2011-0055697 A | 3/2011 |
| KR | 10-1997-0038815 A | 7/1997 |
| KR | 10-0132348 A | 12/1997 |
| KR | 10-2015-0083273 A | 7/2015 |

* cited by examiner

[Formula 1]

SYSTEM AND APPARATUS FOR GENERATING VIBRATION OF SEAT OF VEHICLE IN SYNC WITH MUSIC

CROSS-REFERENCE TO THE RELATED APPLICATION

This application claims the benefit of priority to Korean Patent Application No. 10-2020-0116138, filed on Sep. 10, 2020, in the Korean Intellectual Property Office, the disclosure of which is incorporated herein by reference in its entirety.

TECHNICAL FIELD

The present disclosure relates to a system and an apparatus for generating a vibration of a seat of a vehicle in sync with music, and more particularly, to a system and an apparatus for generating a vibration of a seat of a vehicle in sync with music for actively generating a vibration in the seat of the vehicle in sync with music output from an audio device using an electric motor included in the seat to adjust the seat in forward and backward directions and upward and downward directions.

BACKGROUND

There is a technology for forcibly vibrating a seat of a vehicle as necessary in order to draw the attention of an occupant in a vehicle or to prevent drowsy driving.

Conventionally, in order to generate a desired vibration in a seat of a vehicle, a separate actuator for generating a vibration of the seat is used.

That is, an electro-dynamic actuator, a pneumatic actuator, or the like is installed inside a seat cushion or a seat frame so as to generate desired vibration in a seat of a vehicle in accordance with the circumstances.

However, a separate actuator is used to generate vibration of the seat, and therefore, the weight and the cost of a vehicle are increased.

In the case of a vibrating seat, an electric motor required to adjust the seat in forward and backward directions and upward and downward directions is installed in the seat, and thus, when a separate actuator is additionally installed in the seat in order to generate vibration of the seat, the weight as well as the cost of the vehicle greatly increase.

It will be understood that the above matters described in the related art are merely for promotion of understanding of the background of the disclosure, and should not be recognized as prior art that is well-known to those skilled in the art.

SUMMARY

The present disclosure has been made in view of the above problems, and it is an object of the present disclosure to provide a system and apparatus for generating a vibration of a seat of a vehicle in sync with music for generating a vibration in the seat using an electric motor included in the seat to adjust the seat in forward and backward directions and upward and downward directions and for actively generating a vibration in the seat of the vehicle in sync with music output from an audio device included in the vehicle, whereby a separate actuator, which would otherwise be required to vibrate the seat, is obviated, thereby preventing increased weight and cost, and an occupant advantageously feels lively, feels happy, and feels safe due to the vibration provided to the seat in sync with a music signal.

In accordance with an aspect of the present disclosure, the above and other objects can be accomplished by the provision of a system for generating a vibration of a seat of a vehicle in sync with music output from an audio device using an electric motor disposed in the seat to adjust the seat in forward and backward directions and upward and downward directions, the system including: an electric-motor multiple-control circuit configured to receive a signal of a seat position adjustment switch and a signal of an audio switch, to generate a driving current required to vibrate the seat, and then to output the driving current to an electric motor, wherein the electric motor receives the signal of the electric-motor multiple-control circuit and generates a motor torque while being driven, and the generated motor torque is transferred to the seat to generate a target vibration in the seat.

The motor torque generated by the electric motor may be transferred to a seat rail through a rail cross bar for connecting the electric motor and the seat rail and may then be transferred to the seat coupled to the seat rail.

The vibration generated from the seat may be a vibration formed by adding beat for generating a vibration in a specific frequency band in sync with the music output from the audio device of the vehicle.

The seat may be rotated together when the seat vibrates due to the motor torque output from the electric motor.

The electric-motor multiple-control circuit may include a signal processor configured to receive the signal of the seat position adjustment switch and the signal of the audio switch to generate a target signal for controlling a position of a seat and a target signal for generating a vibration of the seat, respectively, to synthesize the target signal for controlling the position of the seat and the target signal for generating a vibration of the seat into one target signal, and then to generate a target current required to vibrate the seat, a proportional and integral (PI) controller configured to perform PI control using target current generated by the signal processor and a feedback current fed back from the electric motor, a pulse width modulation (PWM) controller configured to calculate a PWM control signal using a signal transmitted through the PI controller, an electric motor driver configured to output a driving current for driving the electric motor according to the PWM control signal, and a motor control circuit power unit configured to supply power required for an operation of the PI controller.

The signal processor may include a processor of the target signal for controlling the position of the seat, configured to receive the signal of the seat position adjustment switch, to extract a direct-current (DC) component, and to generate the target signal for controlling the position of the seat, a processor of the target signal for generating a vibration of the seat, configured to receive the signal of the audio switch, to extract an alternating-current (AC) component, and to generate the target signal for generating a vibration of the seat, and a target signal synthesizer configured to synthesize the target signal for controlling the position of the seat and the target signal for generating a vibration of the seat into one target signal, to generate a target current required to vibrate the seat, and then to output the target current to the PI controller.

When the signal of the seat position adjustment switch and the seat of the audio switch are simultaneously input to the signal processor, the processor of the target signal for controlling the position of the seat may extract and use a DC component of a signal, and the processor of the target signal for generating a vibration of the seat may extract and use an AC component of the signal, and thus the signal of the seat position adjustment switch and the signal of the audio switch may be separately signal-processed without interference therebetween, and two functions may be independently performed.

The processor of the target signal for generating a vibration of the seat may include an input unit configured to receive the music output from the audio device of the vehicle, a mode-setting unit configured to automatically or manually select and set a mode for applying a signal-processing parameter to apply a signal-processing parameter appropriate for a type of the received music, a frequency-mapping unit configured to map high-frequency music to a low-frequency vibration signal to be perceptible to humans depending on the type of music selected by the mode-setting unit, a frequency filter unit configured to perform filtering to exclude, reduce, or increase a signal in a specific frequency band from the mapped low-frequency vibration signal, an envelope application unit configured to convert an envelope of a signal transmitted through the frequency filter unit in a time range to generate strong and weak portions of a beat depending on the type of the selected music, and an output unit configured to generate a music-associated vibration signal transmitted through the envelope application unit and to output the generated signal to the target signal synthesizer.

The type of the music input to the input unit may include dance music, ballads, and classical music, and when the mode-setting unit automatically sets a mode, characteristics of music may be detected by performing fast Fourier transform (FFT) analysis on an initial part of a music signal in real time, and then any one of types of music among dance music, ballads, and classical music is automatically selected.

The type of the music input to the input unit may include dance music, ballads, and classical music, and when the mode-setting unit manually sets a mode, a user may directly and manually select any one of types of music among dance music, ballads, and classical music.

The PI controller may be a circuit configured to receive a result obtained by subtracting a feedback current value received by the electric motor from the target current value generated by the signal processor, to perform PI control, and to output a current.

In accordance with another aspect of the present disclosure, there is provided an apparatus for generating a vibration of a seat of a vehicle in sync with music, the apparatus including: an electric motor disposed in the seat to adjust the seat connected to the seat rail in forward and backward directions and upward and downward directions; a rail cross bar configured to connect the electric motor and the seat rail, and an electric-motor multiple-control circuit connected to an audio device of the vehicle, which is configured to output music, through a communication line, configured to receive an audio signal, to generate a driving current required to vibrate the seat, and then to output the driving current to the electric motor, wherein motor torque of the electric motor is transferred to the seat and simultaneously generates the vibration and rotation, and the vibration in the seat is generated by adding a beat for generating a vibration in a specific frequency band in sync with the music outputted from the audio device.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

In exemplary embodiments of the present disclosure disclosed in the specification, specific structural and functional descriptions are merely illustrated for the purpose of illustrating embodiments of the disclosure and exemplary embodiments of the present disclosure may be embodied in many forms and are not limited to the embodiments set forth herein.

Exemplary embodiments of the present disclosure can be variously changed and embodied in various forms, in which illustrative embodiments of the disclosure are shown. However, exemplary embodiments of the present disclosure should not be construed as being limited to the embodiments set forth herein and any changes, equivalents or alternatives which are within the spirit and scope of the present disclosure should be understood as falling within the scope of the disclosure.

It will be understood that although the terms first, second, third etc. may be used herein to describe various elements, these elements should not be limited by these terms. These terms are only used to distinguish one element from another element. For example, a first element may be termed a second element and a second element may be termed a first element without departing from the teachings of the present disclosure.

It will be understood that when an element, such as a layer, a region, or a substrate, is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Other words used to describe the relationship between elements or layers should be interpreted in a like fashion, e.g., "between," versus "directly between," "adjacent," versus "directly adjacent," etc.

The terms used in the present specification are used for explaining a specific exemplary embodiment, not limiting the present disclosure. Thus, the singular expressions in the present specification include the plural expressions unless clearly specified otherwise in context. Terms such as "include" or "comprise" may be construed to denote a certain characteristic, number, step, operation, constituent element, or combination thereof, but may not be construed to exclude the existence of or possibility of addition of one or more other characteristics, numbers, steps, operations, constituent elements, or combinations thereof.

Unless otherwise defined, all terms including technical and scientific terms used herein have the same meaning as commonly understood by one of ordinary skill in the art to which this present disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A controller (a control device) according to an exemplary embodiment of the present disclosure may be embodied through a processor (not shown) configured to perform an operation that is described below using data stored in a non-volatile memory (not shown) and a corresponding memory, which are configured to store data about an algorithm for controlling operations of various components of a vehicle or software commands for reproducing the algorithm. Here, the memory and the processor may be embodied in separate chips. Alternatively, the memory and the processor may be embodied in a single integrated chip. The processor may be configured in the form of one or more processors.

Hereinafter, a system and apparatus for generating a vibration of a seat of a vehicle in sync with music according to an exemplary embodiment of the present disclosure will be described with reference to the accompanying drawings.

According to the present disclosure, as shown in FIGS. 1 to 6, a seat 1 of a vehicle may be connected to a seat rail 2 which may be connected to a rail cross bar 3. An electric motor 4 may be coupled to the rail cross bar 3, and may include an electric-motor multiple-control circuit 5 configured to transfer an electrical signal. The electric-motor multiple-control circuit 5 may be connected to an audio switch 601 of an audio device 6 included in the vehicle through a wired or wireless communication line 602 to transfer a music signal.

Figure 1:
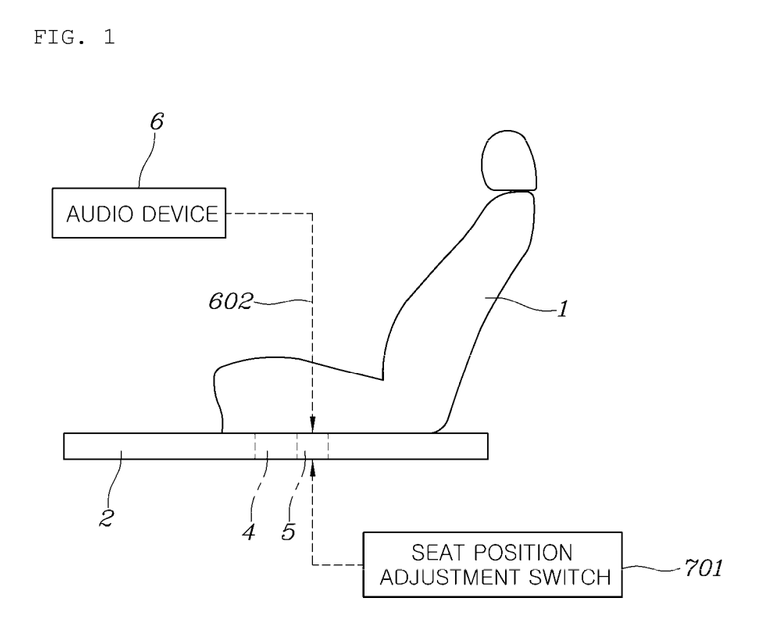
FIG. 1 is a schematic diagram showing a configuration for explaining a system and apparatus for generating a vibration of a seat in sync with music according to an exemplary embodiment of the present disclosure.
Figure 2:
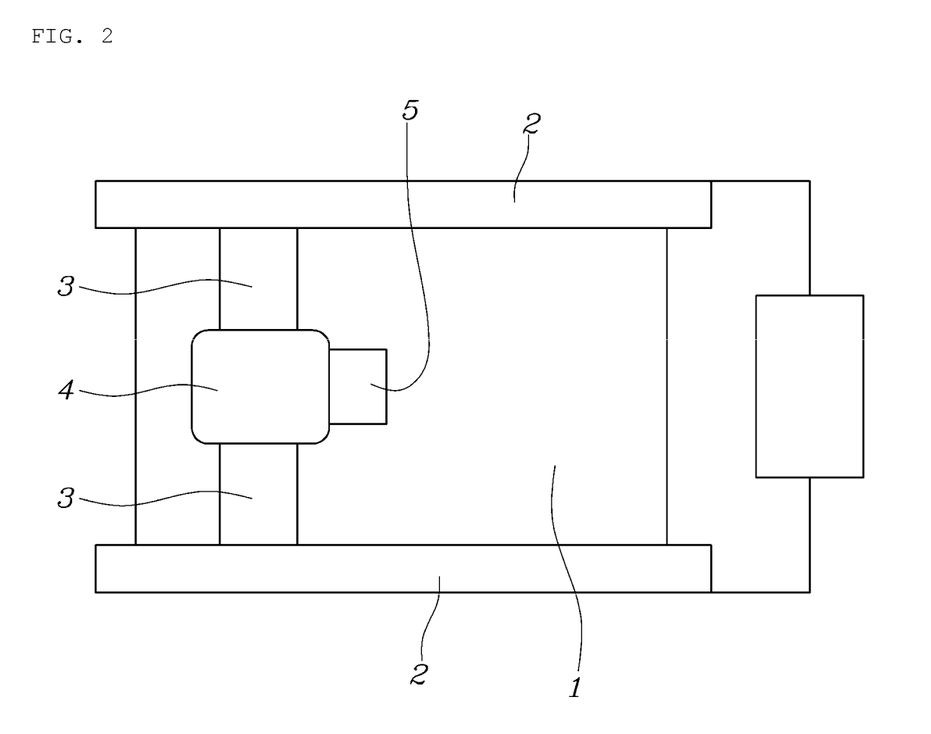
FIG. 2 is a bottom view of FIG. 1.

The electric-motor multiple-control circuit 5 may be configured to receive a signal of a seat position adjustment switch 701 for adjusting the seat 1 in forward and backward directions and upward and downward directions.

The electric motor 4 may be installed in the seat 1 and may be used to adjust the seat 1 in forward and backward directions and upward and downward directions. According to the present disclosure, the electric motor 4 may adjust the position of the seat 1 and may also simultaneously generate desired vibration and rotation of the seat 1 of the vehicle in sync with music provided by the audio device 6 of the vehicle.

That is, a driving current for operating the electric motor 4 may be determined in such a way that the audio device 6 of the vehicle receives a music signal through the wired or wireless communication line 602 and the electric-motor multiple-control circuit 5 generates desired vibration in the seat 1, and when the driving current drives the electric motor 4 to generate a motor torque $T_e$, the motor torque may be transferred to the seat rail 2 through the rail cross bar 3 and may be continuously transferred to the seat 1 connected to the seat rail 2, and thus desired vibration and rotation may be simultaneously generated in the seat 1 of the vehicle.

In this case, the vibration generated in the seat 1 may be set to match the music being reproduced by the audio device 6 of the vehicle by adding a specific beat or generating a vibration in a specific frequency band in sync with the music output from the audio device 6 of the vehicle.

Figure 3:
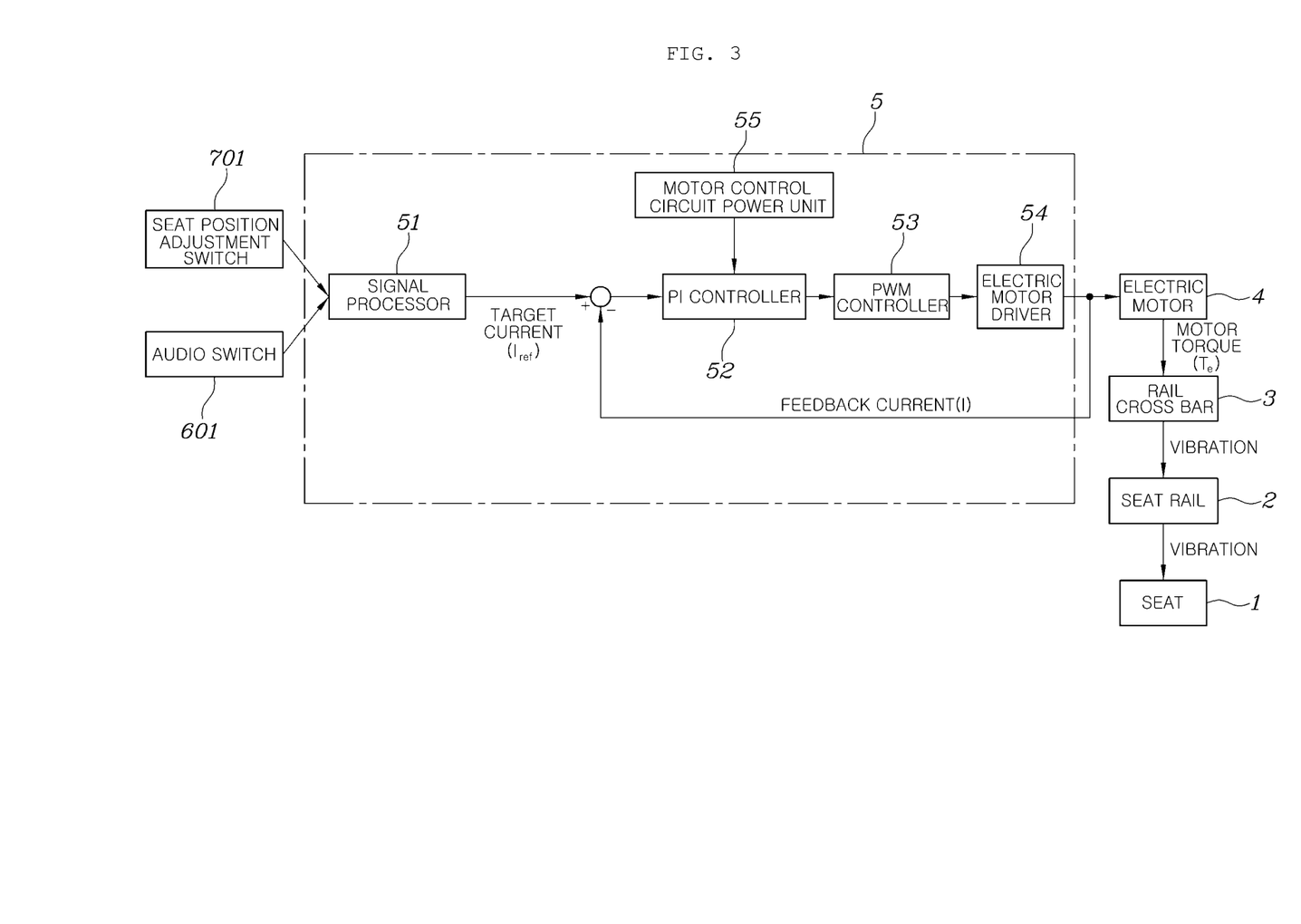
FIG. 3 is a block line diagram of a signal flow of a system for generating a vibration of a seat in sync with music according to an exemplary embodiment of the present disclosure.

The configuration and signal flow of the electric-motor multiple-control circuit 5 will be described with reference to FIG. 3.

When a user manipulates the seat position adjustment switch 701 to adjust the position of the seat 1 of the vehicle or selects music by manipulating the audio switch 601 to listen to music, a signal of the seat position adjustment switch 701 and a signal of the audio switch 601 may be input to a signal processor 51, and the signal processor 51 may generate a target current by forming a target signal for controlling the position of a seat and a target signal for generating a vibration of a seat and synthesizing the formed target signals, and may then output current for driving the electric motor 4 through a PI controller 52, a PWM controller 53, and an electric motor driver 54.

Here, the target signal for controlling the position of a seat may be used by extracting a direct-current (DC) component (low-frequency component) of a signal, and the target signal for generating a vibration of a seat may be used by extracting an alternating-current (AC) component (high-frequency component) of the signal, and thus, even if the two signals are simultaneously input, two functions may be independently performed without interference between the two signals.

The electric-motor multiple-control circuit 5 may be a circuit unit for synthesizing the target signals to generate target vibration and outputting the driving current for controlling the electric motor 4, and may include, as components, the signal processor 51 that receives the signal of the seat position adjustment switch 701 and the signal of the audio switch 601 to generate the target signal for controlling the position of a seat and the target signal for generating a vibration of a seat, respectively, synthesizes the target signal for controlling the position of a seat and the target signal for generating a vibration of a seat into one target signal, and then generates the target current required to vibrate the seat 1, the PI controller 52 for performing proportional and integral (PI) control using a target current value $I_{ref}$ generated by the signal processor 51 and a feedback current value I fed back from the electric motor 4, the PWM controller 53 for calculating a pulse width modulation (PWM) control signal using a signal transmitted through the PI controller 52, the electric motor driver 54 for outputting driving current for driving the electric motor 4 according to the PWM control signal, and a motor control circuit power unit 55 for supplying power required for an operation of the PI controller 52.

When an occupant adjusts the position of the seat 1 of the vehicle or selects music, the signal processor 51, as the first component of the electric-motor multiple-control circuit 5, may generate a target current by receiving information thereon to form the target signal for controlling the position of a seat and the target signal for generating a vibration of a seat and synthesizing the target signals.

Figure 7:
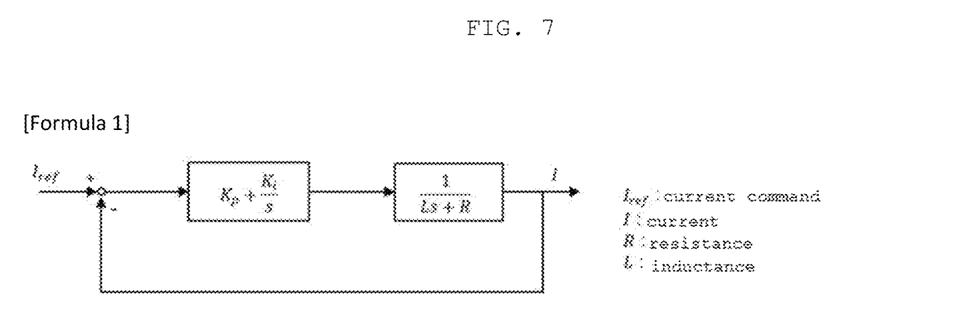
FIG. 7 is a Formula showing a signal flow.

The PI controller 52 may be a circuit that receives a result obtained by subtracting the feedback current value I received by the electric motor 4 from the target current value $I_{ref}$ transmitted from the signal processor 51 and outputs current through proportional and integral (PI) control, the PI controller 52 may include a PI controller and an RL circuit of a motor, a signal flow may be indicated in FIG. 7, a transfer function of a current controller may be represented using Equation 1 below, and a P coefficient $K_p$ and an I coefficient $K_i$ may be acquired by setting pole and zero to have desired control characteristics while having motor constants R and L.

$$G_c(s) = \frac{K_p s + K_i}{s(Ls + R) + (K_p s + K_i)} \quad \text{[Equation 1]}$$

The PWM controller 53 may be a circuit for controlling a switch device of the electric motor driver in a digital manner to input desired current to a winding of the electric motor 4. A pulse-width-modulation (PWM) control method may be a method that is generally used to adjust the speed of a DC motor by repeatedly supplying and interrupting the supply of electricity to a motor at a finely divided time interval. A procedure of forming a PWM signal will be described. When a signal corresponding to a triangular wave or a sawtooth wave is input to one side of a comparator and a signal (a reference signal) for controlling a PWM duty value is input to another side of the comparator, a PWM signal of a square wave may be formed by transmitting the two signals through the comparator.

The electric motor driver 54 may include a gate-driving circuit and a motor-driving circuit, the gate-driving circuit may control a switch device in a digital manner according to each PWM input signal, and the motor-driving circuit may drive a motor using current that is sufficient to drive the motor according to the control result.

The motor control circuit power unit 55 may be a circuit for supplying power required for an operation of the PI controller 52.

The detailed configuration and signal flow of the signal processor 51 included in the electric-motor multiple-control circuit 5 will be described with reference to FIG. 4.

The signal processor 51 may include a processor 512 of the target signal for controlling the position of a seat for generating the target signal for controlling the position of a seat by receiving a signal of the seat position adjustment switch 701 and extracting a DC component, a processor 514 of the target signal for generating a vibration of a seat for generating the target signal for generating a vibration of a seat by receiving a signal of the audio switch 601 and extracting an AC component, and a target signal synthesizer 515 for synthesizing the target signal for controlling the position of a seat and the target signal for generating a vibration of a seat into one target signal and then generating target current required for vibration of a seat and outputting the target current to the PI controller 52.

When receiving a seat operation signal through the seat position adjustment switch 701, a seat position control signal generator 702 may generate a target signal for moving the position of a seat, a seat position control signal collector 511 as a component in the signal processor 51 may receive the target signal and may then transmit the target signal to the processor 512 of the target signal for controlling the position of a seat, and the processor 512 of the target signal for controlling the position of a seat may extract a DC component and may transmit the signal back to the target signal synthesizer 515.

When music to be generated as vibration from an audio output terminal is selected by manipulating the audio switch 601 and is transmitted through the wired or wireless communication line 602, an audio signal collector 513 as a component in the signal processor 51 may receive the music and may then transmit the music to the processor 514 of the target signal for generating a vibration of a seat, and the processor 514 of the target signal for generating a vibration of a seat may extract an AC component and may transmit the signal back to the target signal synthesizer 515.

The target signal synthesizer 515 may synthesize the signal received from the processor 512 of the target signal for controlling the position of a seat and the signal received from the processor 514 of the target signal for generating a vibration of a seat and may then output the synthesized signals to the PI controller 52.

In the present disclosure, the seat position control signal collector 511, the processors 512 and 514, the audio signal collector 513, and the target signal synthesizer 515 are processors such as CPU programmed to perform various functions, or embedded in the signal processor 51 as one computing device. However, it is not limited to be a processor, but these devices can be any type of a computer, control circuit, etc. having a memory as well known in the computing area.

Figure 5:
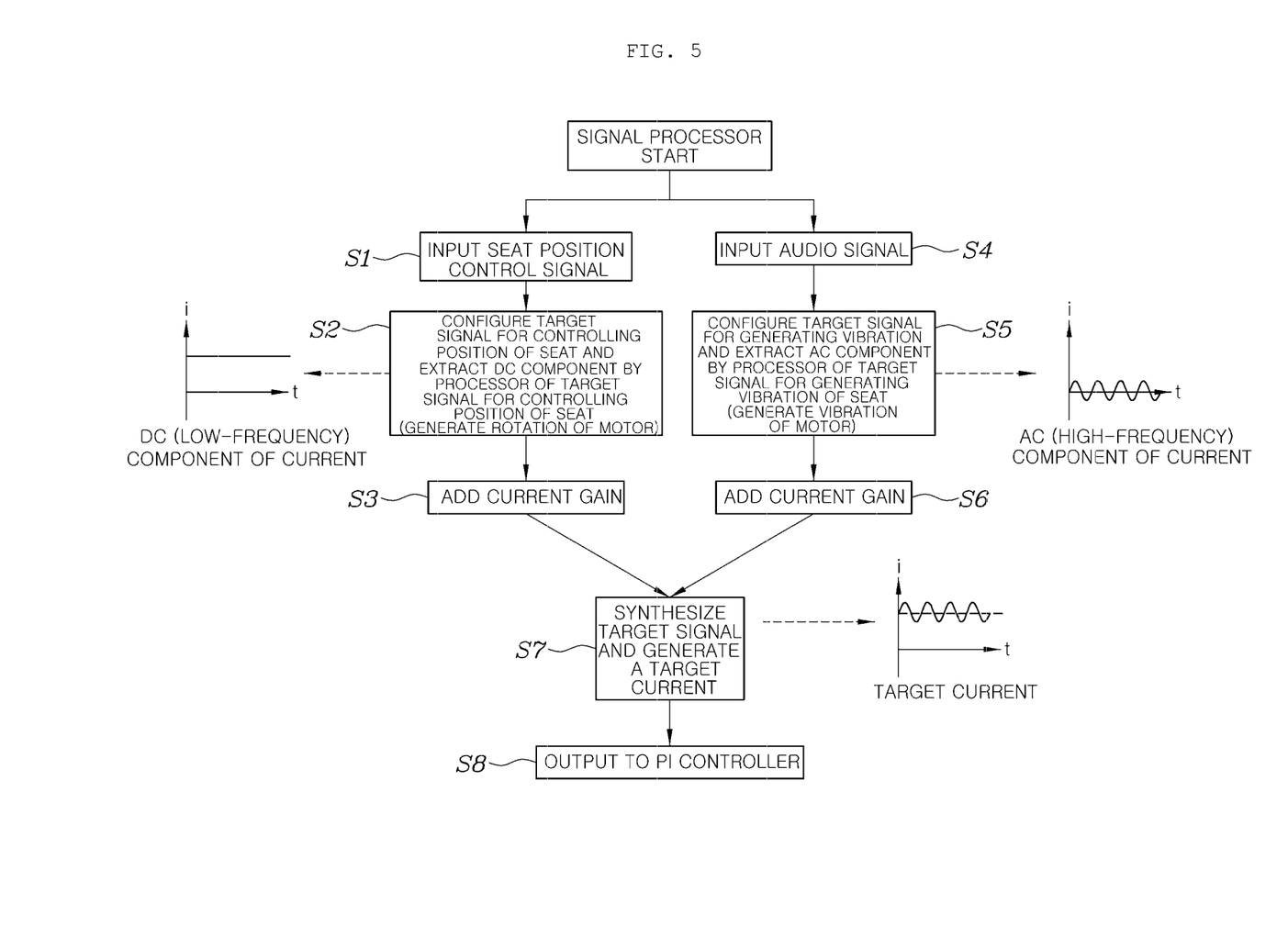
FIG. 5 is a schematic diagram for explaining an operation algorithm of a signal processor according to an exemplary embodiment of the present disclosure.

An operation algorithm of the signal processor 51 will be described with reference to FIG. 5.

First, when receiving a seat position control signal (S1), the processor 512 of the target signal for controlling the position of a seat may configure a target signal and may extract only a DC component (S2, the left drawing of operation S2), and may add a current gain thereto (S3).

Then, when receiving an audio signal (S4), the processor 514 of the target signal for generating a vibration of a seat may configure a target signal for generating a vibration of a seat, and may extract only an AC component (S5, the right drawing of operation S5), and may add a current gain thereto (S6).

Figure 6:
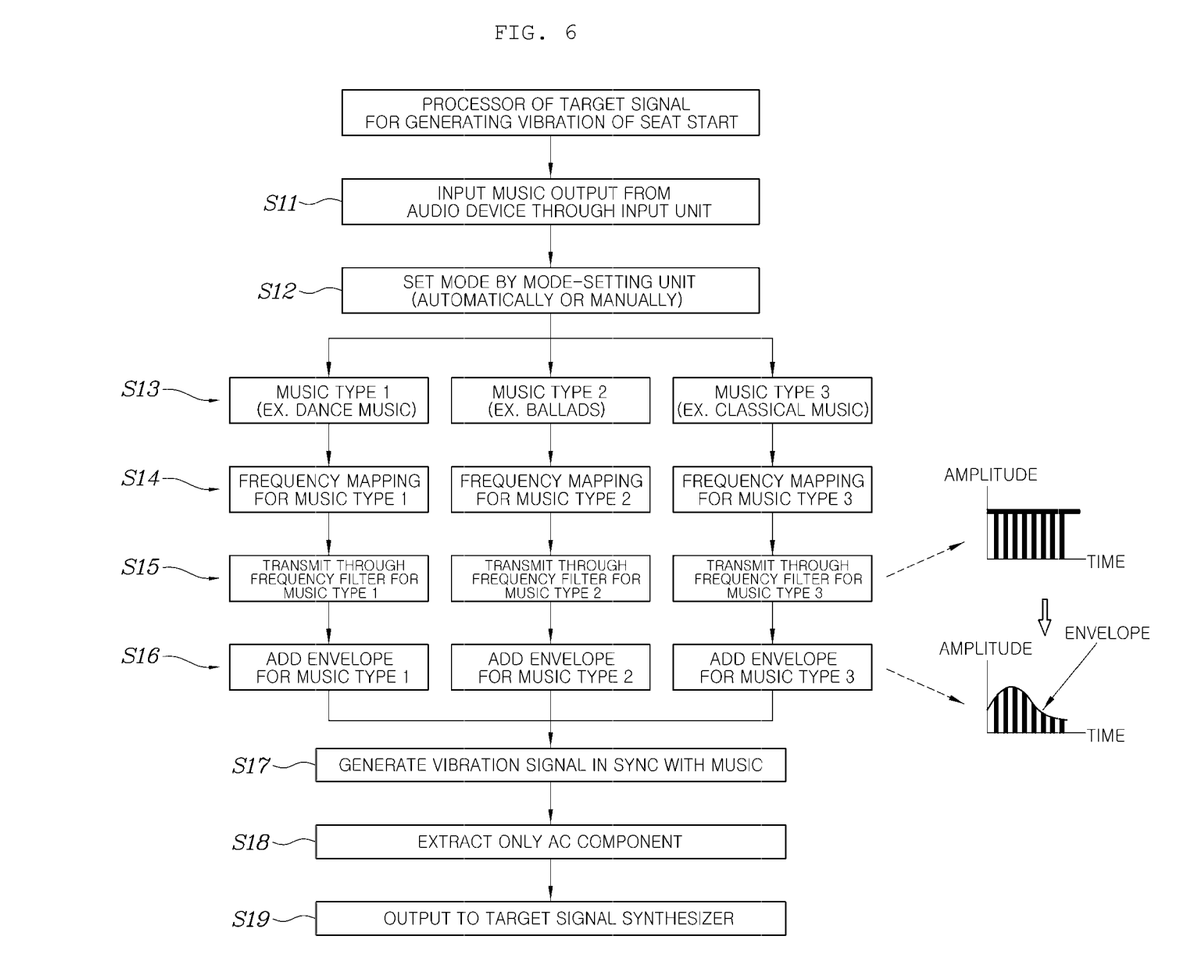
FIG. 6 is a schematic flowchart for explaining a processor of a target signal for generating a vibration of a seat according to an exemplary embodiment of the present disclosure.

For reference, a particular algorithm is not required to configure the target signal of the processor 512 of the target signal for controlling the position of a seat, but a particular algorithm is required in a processor 514 of the target signal for generating a vibration of a seat, which will be described below with reference to FIG. 6.

When the target signal for controlling the position of a seat and the target signal for generating a vibration of a seat to each of which the current gain is added are synthesized in a time range (S7), target current having DC and AC components may be acquired as shown in the right drawing of operation S7, and the value may be transmitted to the PI controller 52 (S8).

For reference, when the seat position adjustment switch 701 is not operated, control may be performed using only the target signal for generating a vibration of a seat, and even if the seat position control signal and the audio signal are simultaneously input, an AC component and a DC component of the target signal may be distinguished from each other, and thus the two signals may be processed separately without interference therebetween and two functions may be controlled to be independently performed.

Figure 4:
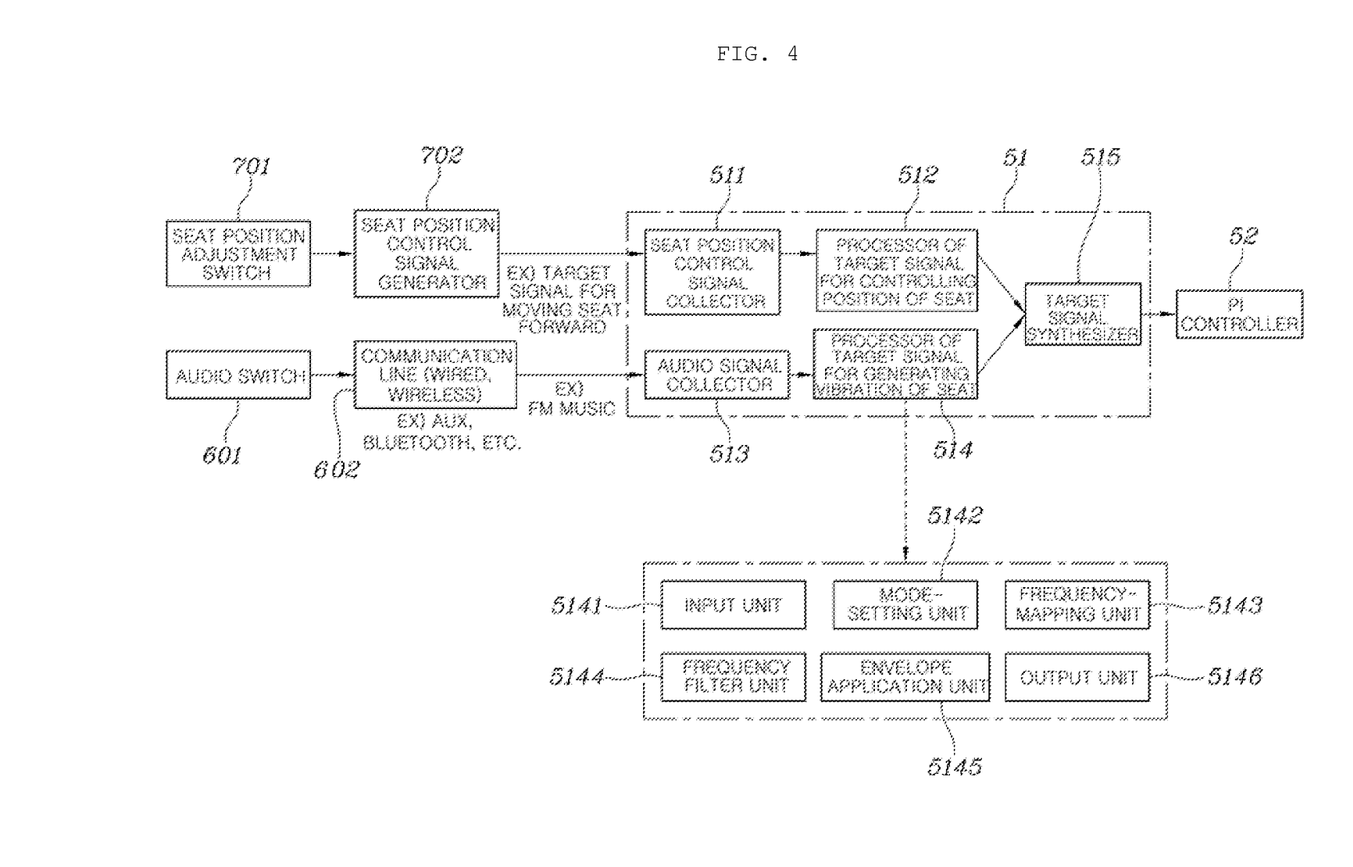
FIG. 4 is a block line diagram of a detailed configuration of a signal processor and a processor of a target signal for generating a vibration of a seat according to an exemplary embodiment of the present disclosure.

The processor 514 of the target signal for generating a vibration of a seat as a core component of the signal processor 51 may include an input unit 5141, a mode-setting unit 5142, a frequency-mapping unit 5143, a frequency filter unit 5144, an envelope application unit 5145, and an output unit 5146, as shown in FIG. 4. In the present disclosure, the input unit 5141, the mode-setting unit 5142, the frequency-mapping unit 5143, the frequency filter unit 5144, the envelope application unit 5145, and the output unit 5146 may be hardware or a computing device such as a processor, or may be integrated into one control unit.

That is, the processor 514 of the target signal for generating a vibration of a seat may include the input unit 5141 for receiving music output from the audio device of a vehicle, the mode-setting unit 5142 for automatically or manually selecting and setting a mode for applying a signal-processing parameter in order to apply a signal-processing parameter appropriate for the type of the received music, the frequency-mapping unit 5143 for mapping high-frequency music to a low-frequency vibration signal to be perceptible to humans depending on the type of music selected by the mode-setting unit 5142, the frequency filter unit 5144 for performing filtering to exclude, reduce, or increase a signal in a specific frequency band from the mapped low-frequency vibration signal, the envelope application unit 5145 for converting an envelope of a signal transmitted through the frequency filter unit 5144 in a time range to generate strong and weak portions of a beat depending on the type of the selected music, and the output unit 5146 for generating a music-associated vibration signal transmitted through the envelope application unit 5145 and outputting the generated signal to the target signal synthesizer 515.

The type of music input to the input unit 5141 may include dance music, ballads, and classical music.

When the mode-setting unit 5142 automatically sets a mode, the characteristics of music may be detected by performing fast Fourier transform (FFT) analysis on an initial part of a music signal in real time and then any one of types of music among dance music, ballads, and classical music may be automatically selected, and when the mode-setting unit 5142 manually sets a mode, a user may directly and manually select any one of types of music among dance music, ballads, and classical music.

An operation algorithm of the processor 514 of the target signal for generating a vibration of a seat will be described with reference to FIG. 6.

First, a music signal of the audio device 6 of the vehicle may be input through the input unit 5141 (S11), and an appropriate mode may be set depending on the characteristics of music (S12).

Mode setting may be automatically or manually performed, and in this regard, in the case of automatic mode setting, the characteristics of music may be detected by performing fast Fourier transform (FFT) analysis on an initial part of a music signal in real time, and then an appropriate mode may be automatically selected, and in the case of manual mode setting, a user may directly select an appropriate type of music by pushing a button.

For example, music type 1 may be dance music, music type 2 may be ballads, and music type 3 may be classical music (S13).

According to the set mode, first, frequency mapping may be performed appropriately for music type 1, music type 2, and music type 3 (S14).

For example, music sampled at 44 kHz may have a maximum frequency of 22 kHz, but vibration that is actually perceptible to humans has only a maximum frequency of several hundreds of Hz, and thus a mapping procedure may be performed to lower all frequencies to about ⅕₀ of the original frequency.

Then, a specific frequency band may be excluded or emphasized again from a signal that is frequency-mapped through a filter for each type of music, that is, music type 1, music type 2, and music type 3 (S15).

For example, in the case of dance music having strong beat, only 200 Hz or less may be used, and a larger weight may be applied to a low-frequency band signal.

Then, strong and weak portions of a beat may be generated through a procedure of adding an envelope of a signal transmitted through a filter in a time band again (S16).

For example, a strong beat for achieving a modulation effect may be formed by changing dance music to a vibration signal having an envelope with a fast gradient, and a weak beat may be formed by changing ballads to a vibration signal having an envelope with a slow gradient.

As such, when the method is performed up to the above operation (S16), the target signal for generating a vibration of a seat may be generated in sync with music (S17), only an AC component may be extracted from the target signal for generating a vibration of a seat (S18), and the target signal for generating a vibration of a seat and the target signal for controlling the position of a seat may be synthesized with each other and then may be transmitted to the PI controller 52.

As described above, according to embodiments of the present disclosure, desired vibration and rotation may be simultaneously generated in the seat of the vehicle using the electric motor 4 included in the seat 1 to adjust the seat 1 in forward and backward directions and upward and downward directions, and thus a separate actuator, which would otherwise be required to vibrate the seat, may be obviated, thereby advantageously preventing increases in weight and cost.

According to the present disclosure, vibration may be actively generated in the seat 1 of the vehicle in sync with music input through the audio device 6 included in the vehicle, and thus an occupant may advantageously comfortable and safe.

In the system and apparatus for generating a vibration of a seat in sync with music in a vehicle according to the present disclosure, desired vibration and rotation may be simultaneously generated in the seat of the vehicle using the electric motor included in the seat to adjust the seat 1 in forward and backward directions and upward and downward directions, and thus a separate actuator, which would otherwise be required to vibrate the seat, may be obviated, thereby advantageously preventing increases in weight and cost.

According to the present disclosure, vibration may be actively generated in the seat of the vehicle in sync with music input through the audio device included in the vehicle, and thus an occupant may advantageously feel comfortable and safe.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A system for generating a vibration of a seat of a vehicle in sync with music outputted from an audio device using an electric motor disposed in the seat to adjust the seat in forward and backward directions and upward and downward directions, the system comprising:
    an electric-motor multiple-control circuit configured to:
        receive a signal of a seat position adjustment switch and a signal of an audio switch,
        generate a driving current required to vibrate the seat, and
        output the driving current to an electric motor,
    wherein the electric motor receives a signal from the electric-motor multiple-control circuit and generates a motor torque while being driven, and
    wherein the generated motor torque is transferred to the seat to generate a target vibration in the seat.

2. The system of claim 1, wherein the motor torque generated by the electric motor is transferred to a seat rail through a rail cross, which is configured to connect the electric motor and the seat rail, and is then transferred to the seat which is disposed on the seat rail.

3. The system of claim 1, wherein the vibration from the seat is generated by adding beat for generating a vibration in a specific frequency band in sync with the music outputted from the audio device of the vehicle.

4. The system of claim 1, wherein the seat is configured to be rotated when the seat vibrates due to the motor torque outputted from the electric motor.

5. The system of claim 1, wherein the electric-motor multiple-control circuit comprises:
   a signal processor configured to:
      receive the signal of the seat position adjustment switch and the signal of the audio switch to generate a first target signal for controlling a position of the seat and a second target signal for generating the vibration of the seat, respectively,
      synthesize the first target signal and the second target signal into one target signal,
      generate a target current required to vibrate the seat;
   a proportional and integral (PI) controller configured to perform PI control using the target current generated by the signal processor and a feedback current fed back from the electric motor;
   a pulse width modulation (PWM) controller configured to calculate a PWM control signal using a signal transmitted through the PI controller;
   an electric motor driver configured to output the driving current for driving the electric motor according to the PWM control signal; and
   a motor control circuit power controller configured to supply power required for an operation of the PI controller.

6. The system of claim 5, wherein the signal processor comprises:
   a first signal processor of the target signal for controlling the position of the seat, configured to:
      receive the signal of the seat position adjustment switch,
      extract a direct-current (DC) component, and
      generate the target signal for controlling the position of the seat;
   a second signal processor of the target signal for generating the vibration of the seat, configured to:
      receive the signal of the audio switch,
      extract an alternating-current (AC) component, and
      generate the target signal for generating the vibration of the seat; and
   a target signal synthesizer configured to:
      synthesize the target signal for controlling the position of the seat and the target signal for generating the vibration of the seat into one target signal,
      generate the target current required to vibrate the seat, and
      output the target current to the PI controller.

7. The system of claim 6, wherein, when the signal of the seat position adjustment switch and the seat of the audio switch are simultaneously input to the signal processor, the first signal processor extracts and uses a DC component of the signal of the seat position adjustment switch and the signal of the audio switch and the second signal processor extracts and uses an AC component of the signal of the seat position adjustment switch and the signal of the audio switch such that the first and second signal processors independently process the two signals to independently perform seat position adjustment and vibration generation functions.

8. The system of claim 6, wherein the second signal processor comprises:
   an input unit configured to receive the music outputted from the audio device of the vehicle;
   a mode-setting unit configured to automatically or manually select and set a mode for applying a signal-processing parameter to apply a signal-processing parameter appropriate for a type of the received music;
   a frequency-mapping unit configured to map high-frequency music to a low-frequency vibration signal to be perceptible to a user depending on the type of music selected by the mode-setting unit;
   a frequency filter unit configured to perform filtering to exclude, reduce, or increase a signal in a specific frequency band from the mapped low-frequency vibration signal;
   an envelope application unit configured to convert an envelope of the signal transmitted through the frequency filter unit in a time range to generate strong and weak portions of a beat depending on the type of the selected music; and
   an output unit configured to generate a music-associated vibration signal transmitted through the envelope application unit and to output the generated signal to the target signal synthesizer.

9. The system of claim 8, wherein the type of the music input to the input unit comprises dance music, ballads, and classical music, and
   wherein, when the mode-setting unit automatically sets a mode, characteristics of music are detected by performing fast Fourier transform (FFT) analysis on an initial part of a music signal in real time, and then any one of types of music among dance music, ballads, and classical music is automatically selected.

10. The system of claim 8, wherein the type of the music input to the input unit comprises dance music, ballads, and classical music, and
    wherein, when the mode-setting unit manually sets a mode, any one of types of music among dance music, ballads, and classical music can be manually selected by the user.

11. The system of claim 5, wherein the PI controller is a circuit configured to receive a result obtained by subtracting a feedback current value received by the electric motor from the target current value generated by the signal processor, to perform PI control, and to output a current.

12. An apparatus for generating a vibration of a seat of a vehicle in sync with music, the apparatus comprising:
   an electric motor disposed in the seat to adjust the seat connected to the seat rail in forward and backward directions and upward and downward directions;
   a rail cross bar configured to connect the electric motor and the seat rail; and
   an electric-motor multiple-control circuit connected to an audio device of the vehicle, which is configured to output the music, through a communication line, the electric-motor multiple-control circuit configured to:
      receive an audio signal,
      generate a driving current required to vibrate the seat, and
      output the driving current to the electric motor,
   wherein a motor torque of the electric motor is transferred to the seat for simultaneously generating the vibration and rotation, and wherein the vibration in the seat is generated by adding a beat for generating a vibration in a specific frequency band in sync with the music outputted from the audio device.

* * * * *